Nov. 3, 1964    F. KLAUS    3,155,043
CENTRIFUGAL PUMPS
Filed March 24, 1961

Inventor
FRANZ KLAUS
By Toulmin & Toulmin
Attorneys

United States Patent Office 3,155,043
Patented Nov. 3, 1964

3,155,043
CENTRIFUGAL PUMPS
Franz Klaus, Blumenfeldstrasse 18, Bochum, Germany
Filed Mar. 24, 1961, Ser. No. 98,089
Claims priority, application Germany, Mar. 28, 1960,
K 40,277
9 Claims. (Cl. 103—87)

The present invention relates to centrifugal pumps and more particularly the invention is concerned with a centrifugal pump of the type in which the output rotor of the driving device and the pump impeller are arranged on a common shaft sealed from the outside and in which the shaft bearings are accommodated in bearing space one end of which communicates with the pump chamber.

Centrifugal pumps of this general type are known in the art. A centrifugal pump with a vertically disposed shaft is known in which the output rotor of the driving device has a tubular extended portion on which the pump impeller is fixedly mounted. Projecting from below into the interior of this tubular extended portion is a tubular portion of the pump casing which encloses the impeller shaft. Between the tubular portion of the pump casing and the impeller shaft a space is formed housing the shaft bearings.

In pumps of this type it is absolutely necessary to prevent the liquid to be pumped from entering the space housing the bearings. This necessity will be easily understood when considering the fact that the liquid to be pumped may be of such chemical nature as would attack the bearings. In addition, impurities, such as small particles of sand, dust, and the like, may be present in the liquid to be pumped, and such impurities would be detrimental to the bearings, if allowed to reach the space housing the bearings.

It has therefore been proposed in the art to provide within the bearing housing and at the upper end thereof a gas cushion operating as a pressure pad, in order to prevent the liquid being pumped from penetrating into the bearing housing. In a similar known type of centrifugal pump, the bearing housing is filled with an inert lubricant which is separated from the liquid being pumped by a cushion of inert gas.

With these known arrangements, the need for stuffing boxes is obviated, since the pump chamber and the housing for the shaft bearings are completely encased and sealed off from the outside, e.g., by a thin-walled tube. It has, however, been found that in many cases the gas pressure pad which separates the liquid being pumped from the lubricant in the bearing housing is absorbed within a relatively short time by the liquid being pumped. If, however, the liquid being pumped is allowed to come into direct contact with the lubricant, chemical or mechanical impurities are liable to be deposited in the lubricant, which eventually may result in damage to or destruction of the bearings.

With the foregoing in mind it is the general object of the invention to provide a centrifugal pump of the general type referred to above, in which the pumped liquid is reliably prevented from damaging the bearing even after prolonged and continuous operation.

A specific object of the invention is to provide a centrifugal pump of the above-mentioned type particularly useful for conveying liquids of a corrosive or similar chemical property tending to attack bearings or deteriorate the lubricant, wherein the pumped liquid is reliably prevented from entering the bearing housing even after prolonged and continuous operation.

Another specific object of the invention is to provide a centrifugal pump of the above-mentioned general type useful for conveying liquids which are substantially chemically harmless per se and even provide lubrication to the bearings but which may contain detrimental impurities and contaminations, and wherein such impurities and contaminations are safely removed before allowing the pumped liquid to reach the bearing housing.

These objects are accomplished by the centrifugal pump of the invention, which is of the general type described above. According to the invention, a bearing space which may contain a lubricant sealing liquid and a pump chamber containing pumped liquid are connected by a clearance space, which may be defined by a tubular elongated portion of the pump casing upwardly adjacent the pump chamber, and an adjacent portion of the rotor of the driving unit of the pump. According to an essential feature of the invention this clearance space has an axially extending portion (i.e., parallel to the main shaft of the pump) communicating with the pump chamber, and a radially extending portion communicating with the bearing space. Furthermore, the respective pressures of the liquid in the bearing space and of the pump liquid are so adjusted relative to one another that a mixing of the liquids occurs only in the radially extending portion, which thus constitutes a mixing zone. This can be accomplished, e.g., by maintaining the pressure of the sealing liquid slightly higher than the pressure of the liquid to be pumped. Due to this arrangement, the mixed liquid in the mixing zone is subject to centrifugal force urging the liquid radially outwardly, i.e., away from the bearing space. Consequently, liquid to be pumped is prevented from entering the bearing space.

By means of the arrangement according to this invention, it is possible in glandless centrifugal pumps to dispense with a gas cushion. This is achieved by virtue of the fact that a very small amount of mixing of the sealing liquid with the liquid being pumped is permitted, i.e., the extent of this mixing is kept so small that it can scarcely be detected in the liquid discharged from the pump. With this end in view, care must be taken to ensure that the mixing zone is always outside the bearing housing, in the clearance interconnecting the bearing housing and the pump chamber. The special arrangement of the clearance ensures that the intermixed liquids are compelled, by the centrifugal force acting upon them in the radial part of the clearance space, to flow in the direction toward the pump chamber, so that the bearing housing always contains only completely pure sealing liquid.

In many cases the liquid entering the clearance space evaporates and is condensed in the parts of the clearance space remote from the pump chamber; it is then preferable to make the radially extending part of the clearance space cup-shaped. Since the liquid condensing in this part is subjected to the forwarding action exerted therein, it is ensured that this condensing liquid cannot penetrate into the bearing space.

The arrangement according to the invention has proved to be particularly advantageous for use in the chemical industry, in cases where a chemically active liquid which may be at a relatively high pressure, e.g., at 25 atmospheres is discharged with a relatively low increase in pressure. If, as has been proved to be advantageous, the clearance space is arranged to open into the pump chamber, it is preferable, in the example just mentioned, to supply the sealing liquid to the bearing housing at a slightly higher pressure, e.g., in this case at a pressure of 27 atmospheres.

According to another embodiment of the invention which is particularly useful for pumping liquids having lubricating properties, the sealing liquid is obtained by tapping part of the pumped liquid from the high pressure side of the pump and using this as a sealing liquid. According to this embodiment of the invention a liquid withdrawal chamber is provided in the pressure delivery passage of the pump. The liquid withdrawal chamber is separated from the interior of the pressure delivery passage by a filter element, but communicates with the bearing space so that only filtered pumped liquid is allowed to enter the bearing space to effect lubrication of the bearings.

The invention will next be described in greater detail with reference to the accompanying drawings in which—

Figure 1:
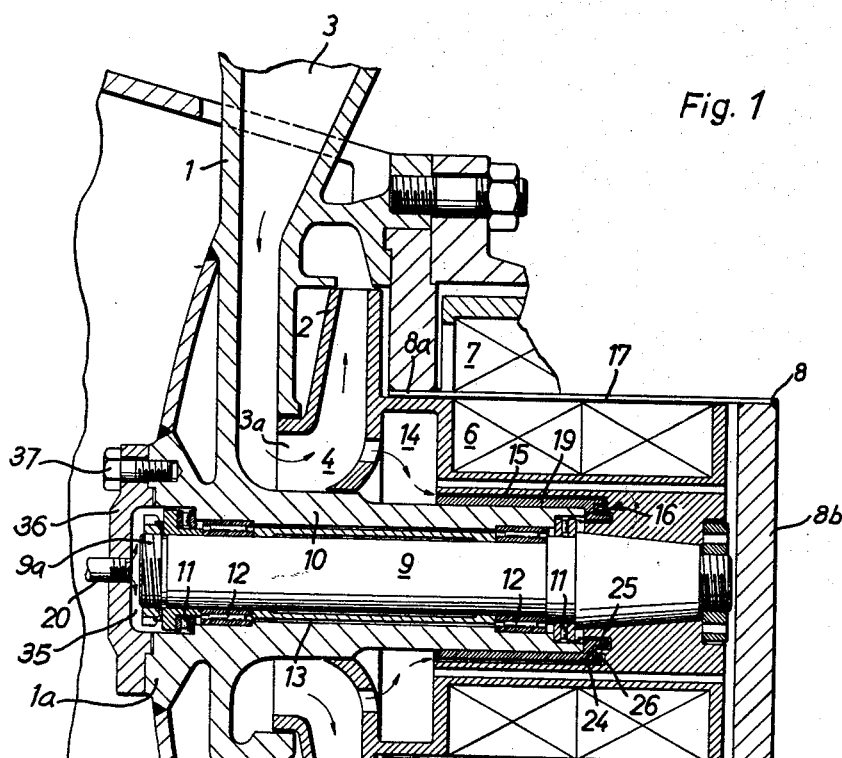
FIGURE 1 is a somewhat fragmentary axial cross-sectional view of a centrifugal pump according to the invention.

It will be noted that FIGURE 1 has been turned through 90°, so that the part of the pump which will normally be lowermost is seen on the left side of the drawing.

Referring now to FIGURE 1 in greater detail, in a casing 1 of conventional construction is arranged a centrifugal rotary impeller 2 which is likewise of conventional structure.

The liquid to be pumped is supplied to impeller 2 through an inlet passage 3 and a central suction opening 3a. The impeller 2 is arranged to discharge the liquid into an annular passage 5 which in turn opens into an outlet passage 5a. In the embodiment illustrated, the impeller 2 is made as one integral piece with the output rotor 6 of a non-positive drive unit. In the present case, the drive is effected in known manner, e.g. by permanent magnets. Located in the clearance between the rotor 6 and a driving sleeve 7 of the permanent magnet drive is a thin-walled pot-shaped, tubular cap element 8 which has a thin cylindrical wall portion 8a and a front portion 8b. The cap element 8 is rigidly connected to the pump casing and by virtue of its pot-shaped construction seals the pump chamber from the outside in a liquid-tight manner.

Rigidly connected to the rotor 6 is a stub shaft 9 which extends through the entire length of the pump casing and is located within a tubular projection 10 formed integrally with the pump casing. This tubular projection 10 extends upward from the underside of the pump casing 1 to a considerable distance within the rotor 6. Between the shaft 9 and the tubular projection 10 on the pump casing, there is provided an annular bearing space 13 in which bearings, such as e.g. axial thrust bearings 11 and needle bearings 12 are accommodated.

Between the rotor 6 of the permanent magnet driving unit and the suction space 4 of the pump impeller 2 is arranged a chamber 14 which, in the present case, communicates directly with the suction space 4 of the rotor 2. There is also a direct communication between the chamber 14 and the bearing housing 13 via a constricted clearance space 15 of substantial length. This clearance space 15 extends from the chamber 14 between the tubular projection 10 on the housing and the rotor 6 of the driving unit as far as a radial portion 16 which opens directly into the bearing housing 13.

The axially extending portion of the constricted space 15 is of small radial depth. Advantageously, this depth is smaller than the clearance 17 between the rotor 6 and the tube 8. This ensures that, if the bearings for the shaft 9 should be damaged, no contact will occur between the rotor 6 and the tube 8, since the surfaces defining the axially extending portion of the throttle clearance space 15 will have come into bearing contact with one another.

It is advantageous to restrict the clearance space 15, on the side on which the tubular projection 10 is located, by means of a separate part 19 which is composed of a material which enables it to act as an emergency bearing.

The bearing housing 13 is filled in known manner with an inert lubricating substance, i.e. a so-called sealing liquid. In the example illustrated, this sealing liquid is introduced into the bearing housing from beneath the pump casing through a pipe 20. The pressure of the sealing liquid is then so adjusted that it slightly exceeds the pressure in the chamber 14 of the liquid to be pumped. If, for example, there is a pressure in the chamber 14 of 25 atmospheres, it has been found advantageous for the sealing liquid to have a pressure of 27 atmospheres.

It is possible, at the commencement of operation, for an air pocket to be formed in the upper end part of the clearance space 15. With the known units, attempts have been made to utilize this air pocket as a means for keeping the liquid to be pumped separate from the sealing liquid in the bearing housing. It has, however, been found that the air or some other sealing gas will be absorbed after a short time by the liquid to be pumped and will consequently lose its ability to act as a seal. With the present arrangement, therefore, such an air pocket is dispensed with from the outset. By providing a clearance space with an axially extending part 15 and a radially extending part 16 and by supplying a sealing liquid at a somewhat increased pressure, it is possible to ensure that the zone where mixing can occur between the liquid to be pumped and the sealing liquid is confined to the radial zone 16. This radially extending part of the clearance space has greater cross-sectional dimensions than the axially extending part, so that the centrifugal force can act upon the liquid contained therein. Consequently, a forwarding action is exerted in this zone outwardly in the radial direction, which forwarding action ensures that the slightly mixed liquids are caused to flow outwardly.

The arrangement according to this invention is particularly effective in cases where the liquid to be pumped is capable of evaporating in the clearance space near the chamber 14. Since the evaporated liquid can be condensed in the radially extending part 16 of the clearance space which is remote from the chamber 14, the radially extending portion is preferably made of labyrinth or U- or cup-shaped form, such as indicated at 24. This U-shaped portion has a first leg 25 closer to shaft 9 and extending further axially upwardly, i.e. higher, than the second leg 26 of the cup 24. This ensures that the mixed liquids cannot possibly penetrate past the leg 25 into the bearing housing 13.

Since the portion of the liquids which become mixed together is small, penetration of the mixed liquids into the chamber 14 and consequently into the fluid to be pumped can be allowed to occur without any detrimental effect upon the latter.

The use of the invention offers advantages not only in cases in which the chemical nature of the liquid to be pumped would be detrimental to the bearings, but also in cases where such detrimental effect is only to be feared because of mechanical impurities in the liquid to be pumped.

The sealing liquid can be supplied to the bearing space advantageously from a supply chamber 35 formed between the lower end 9a of shaft 9 and a lowermost portion 1a of the casing 1, and closed by a preferable detachable cap element 36 which may be attached to the casing by a screw 37. The sealing liquid can be fed into the supply chamber 35 either upon removal of the cap member 36, or, preferably, through a feed pipe 20.

In cases in which the liquid to be pumped has lubricating properties and remains inert with respect to the bearing parts, the sealing liquid can be obtained by tapping some of the pumped liquid from the high pressure side of the pump to serve as sealing liquid. A particularly advantageous embodiment for this purpose is shown in FIGURE 2.

Figure 2:
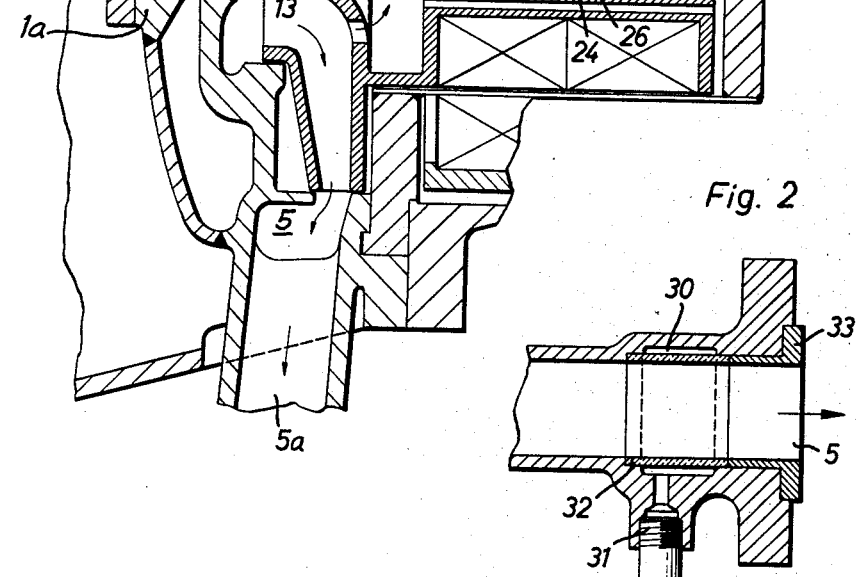
FIGURE 2 is a fragmentary cross-section illustrating a modification of the arrangement shown in FIGURE 1.

FIGURE 2 shows the outlet portion 5 of the pump casing on the high pressure side of the pump only. In this portion 5 an annular chamber 30 is provided at a suitable position along the path of the liquid to be pumped. This annular chamber communicates through a pipe 31 with the pipe 20, and forms a liquid withdrawal chamber. As shown in FIGURE 1, the pipe 20 opens into the supply chamber 35. The annular chamber 30 is separated from the flow path of the liquid to be pumped in the outlet portion 5 by a cylindrical filter element 32 which may for example be held in position by means of a screwed-in retaining ring 33. The filter element 32 is so constructed and dimensioned that all impurities in the liquid being pumped, in so far as these could cause damage to the bearings in the bearing housing, are retained, so that only cleaned or filtered liquid can be delivered from the high pressure outlet passage 5, via the pipe 31 and the pipe 20, into the bearing space.

It will be understood that this invention is susceptible to modifications in order to adapt it to different usages and conditions and, accordingly, it is desired to comprehend such modifications within this invention as may fall within the scope of the appended claims.

What is claimed is:

1. In a centrifugal pump, the combination comprising: a pump casing having an elongated tube communicating with the interior thereof, a drive unit including a rotor sealed from the exterior, a hollow pump impeller receiving a liquid to be pumped and delivering the same, a shaft journalled in said tube and projecting from one end thereof, being sealed from the exterior and defining a bearing space between shaft and tube, means surrounding said tube and securing said rotor and said impeller onto the projecting end of said shaft, and for defining a pump chamber communicating with said impeller, said securing means further defining an axial clearance space extending along an outer portion of said tube and communicating with said pump chamber, said securing means and said tube further defining a radial clearance space communicating with both, said bearing space and said axial clearance space and having a larger cross-section than said axial clearance space, and a pressurized, lubricating and sealing liquid in said bearing space, the pressure of said sealing liquid being slightly above the pressure of the liquid to be pumped existing at the entrance of said axial bearing space to said pumping chamber so as to allow mixing of said liquids in said radial clearance space and further allowing for centrifugal action urging any liquid mixture outwardly in radial direction away from said bearing space.

2. In a centrifugal pump, comprising a drive unit, an output rotor in said drive unit, a hollow pump impeller receiving a liquid to be pumped and delivering the same, a shaft supporting said pump impeller and said output rotor, a pump casing having an elongated tubular portion surrounding said shaft and defining with the latter a bearing space containing a lubricating sealing liquid under pressure, said impeller, said rotor and said tubular portion of said pump casing defining a pump chamber, with an opening in said tubular pump impeller establishing communication with said pump chamber, a portion of said elongated tubular portion upwardly adjacent said pump chamber and a portion of said rotor adjacent said elongated tubular portion defining a clearance space having an axially extending portion with a lowermost end leading into said pump chamber and receiving liquid to be pumped from said impeller via said pump chamber, said clearance space further having a substantially U-shaped, radially extending clearance space portion contiguous with said axially extending portion and leading into said bearing space there being a mixing zone in said radially extending portion wherein mixing of said sealing liquid from said bearing space and liquid to be pumped from said axially extending portion may occur, with the sealing liquid being subjected to a predetermined pressure in said bearing space which is greater than the pressure of the liquid to be pumped in said axially extending portion, said radially extending portion having a greater cross-section than said axially extending portion, so as to allow for centrifugal action urging the liquid in said mixing zone outwardly in radial direction away from said bearing space.

3. In a centrifugal pump, comprising a drive unit, an output rotor in said drive unit, a hollow pump impeller receiving a liquid to be pumped and delivering the same, a shaft supporting said pump impeller and said output rotor, a pump casing having an elongated tubular portion surrounding said shaft and defining with the latter a bearing space containing a lubricating sealing liquid under pressure, said impeller, said rotor, and said tubular portion of said pump casing defining a pump chamber, with an opening in said tubular pump impeller establishing communication with said pump chamber, a portion of said elongated tubular portion upwardly adjacent said pump chamber and a portion of said rotor adjacent said elongated tubular portion defining a clearance space having an axially extending portion with a lowermost end leading into said pump chamber and receiving liquid to be pumped from said impeller via said pump chamber, said clearance space further including a substantially U-shaped, radially extending clearing space portion having a first leg portion and a second leg portion, the first leg portion being closer to said shaft, communicating with said bearing space and extending further axially upwardly than said second leg portion, said second leg portion leading into said axially extending portion, said radially extending clearing space portion constituting a mixing zone wherein mixing of said sealing liquid from said bearing space and liquid to be pumped from said axially extending portion may occur, with the sealing liquid being subjected to a determined pressure in said bearing space which is greater than the pressure of the liquid to be pumped in said axially extending portion, said radially extending portion having a greater cross-section than said axially extending portion, so as to allow for centrifugal action urging the liquid in said mixing zone outwardly in radial direction away from said bearing space.

4. In a centrifugal pump, comprising a drive unit, an output rotor in said drive unit, a hollow pump impeller receiving a liquid to be pumped and delivering the same, a shaft supporting said pump impeller and said output rotor, a pump casing having an elongated tubular portion surrounding said shaft and defining with the latter a bearing space containing a lubricating sealing liquid under pressure, said impeller, said rotor, and said tubular portion of said pump casing defining a pump chamber, with an opening in said tubular pump impeller establishing communication with said pump chamber, a sleeve member contiguous with a portion of said elongated tubular portion upwardly adjacent said pump chamber, and being adjacent said rotor, said sleeve member having an axially extending body portion and a radially extending flange portion and forming with said rotor a clearance space having an axially extending portion with a lowermost end leading into said pump chamber and receiving liquid to be pumped from said impeller via said pump chamber, and said clearance space having a radially extending clearance space portion communicating with said axially extending clearance space portion and leading into said bearing space and constituting a mixing zone wherein mixing of said sealing liquid from said bearing space and liquid to be pumped from said axially extending portion may occur, with the sealing liquid being subjected to a determined pressure in said bearing space which is greater than the pressure of the liquid to be pumped in said axially extending portion, said radially extending portion having a greater cross-section than said axially extending portion, so as to allow for centrifugal action urging the liquid in said mixing zone outwardly in radial direction away from said bearing space.

5. In a centrifugal pump according to claim 4, and further comprising a thin-walled pot-shaped tubular cap element fixedly connected with said pump casing sealing said pump chamber, said element surrounding said rotor but being spaced therefrom by a determined clearance larger in radial direction than said axially extending portion of said clearance space.

6. In a centrifugal pump, comprising a drive unit, an output rotor in said drive unit, a hollow pump impeller receiving a liquid to be pumped and delivering the same, a shaft supporting said pump impeller and said output rotor, a pump casing having an elongated tubular portion surrounding said shaft and defining with the latter a bearing space containing a lubricating sealing liquid under pressure, said impeller, said rotor, and said tubular portion of said pump casing defining a pump chamber, with an opening in said tubular pump impeller establishing communication with said pump chamber, a sleeve member consisting of bearing material contiguous with a portion of said elongated tubular portion upwardly adjacent said pump chamber, and being adjacent said rotor, said sleeve member having an axially extending body portion and a radially extending flange portion and forming with said rotor a clearance space having an axially extending portion with a lowermost end leading into said pump chamber and receiving liquid to be pumped from said impeller via said pump chamber, said clearance space having a radially extending portion contigual with said axially extending portion and leading into said bearing space and constituting a mixing zone wherein mixing of said sealing liquid from said bearing space and liquid to be pumped from said axially extending portion may occur, with the sealing liquid being subjected to a determined pressure in said bearing space which is greater than the pressure of the liquid to be pumped in said axially extending portion, said radially extending portion having a greater cross-section than said axially extending portion, so as to allow for centrifugal action urging the liquid in said mixing zone outwardly in radial direction away from said bearing space.

7. In a centrifugal pump according to claim 1, with an outlet portion in said pump casing communicating with said pump impeller, an annular portion in said outlet portion forming a pumped liquid withdrawal chamber, pipe means connecting said withdrawal chamber with said bearing space, and a filter element between said withdrawal chamber and said pipe means, so as to effect filtration of pumped liquid flowing from said withdrawal chamber through said filter element and said pipe means into said bearing space to serve as a purified sealing liquid.

8. In a centrifugal pump according to claim 1, with said shaft having a lower portion and said pump casing having a lower portion, both of said lower portions defining a supply chamber communicating with said bearing space so as to supply sealing liquid to the latter.

9. In a centrifugal pump according to claim 1, with said shaft having a lower portion and said pump casing having a lower portion and a detachable cap element on said lower casing portion, said lower portions and said cap member defining a supply chamber, and a supply pipe leading from the outside into said supply chamber, said supply chamber communicating with said bearing space so as to supply sealing liquid to the latter.

References Cited in the file of this patent

UNITED STATES PATENTS

| 2,799,227 | Allen | July 16, 1957 |

FOREIGN PATENTS

| 1,048,478 | Germany | Jan. 8, 1959 |
| 682,015 | Great Britain | Nov. 5, 1952 |
| 746,428 | Great Britain | Mar. 14, 1956 |
| 881,400 | Great Britain | Nov. 1, 1961 |